United States Patent [19]
Mori

[11] Patent Number: 5,418,946
[45] Date of Patent: May 23, 1995

[54] STRUCTURED DATA CLASSIFICATION DEVICE

[75] Inventor: Toshiaki Mori, Yokohama, Japan

[73] Assignee: Fuji Xerox Co., Ltd., Japan

[21] Appl. No.: 951,216

[22] Filed: Sep. 25, 1992

[30] Foreign Application Priority Data

Sep. 27, 1991 [JP] Japan ................... 3-249580

[51] Int. Cl.$^6$ ................... G06F 15/40; G06F 3/00
[52] U.S. Cl. ................... 395/600; 395/425; 395/160; 364/DIG. 2
[58] Field of Search ................... 395/600, 160, 425; 364/DIG. 1, DIG. 2

[56] References Cited

U.S. PATENT DOCUMENTS

| | | | |
|---|---|---|---|
| 4,319,337 | 3/1982 | Sander et al. | 364/900 |
| 4,468,728 | 8/1984 | Wang | 364/200 |
| 4,601,021 | 7/1986 | Paul et al. | 364/521 |
| 4,653,021 | 3/1987 | Takagi | 364/900 |
| 4,999,790 | 3/1991 | Murayama et al. | 364/521 |
| 5,060,277 | 10/1991 | Bokser | 382/14 |
| 5,247,666 | 9/1993 | Buckwold | 395/600 |
| 5,295,062 | 3/1994 | Fukushima | 364/188 |
| 5,299,303 | 3/1994 | Fukunaga | 395/146 |

Primary Examiner—Thomas G. Black
Assistant Examiner—Jean R. Homere
Attorney, Agent, or Firm—Welsh & Katz, Ltd.

[57] ABSTRACT

When a retrieval condition designating unit designates "data to be retrieved" and "retrieval condition" as data on retrieval of a document, and a classification attribute designating unit designates a "component's name" as data on classification of the document, a structured document retrieving unit first retrieves a structured document group among a plurality of structured documents stored in a structured document storing unit on the basis of the designated "data to be retrieved" and "retrieval condition" and transfers the document group to a structured document classifying unit, which classifies the document group on the basis of the designated "component's name". The result of the classification is displayed on a display unit. Thus, by designating the components constituting a structured document by their component's names, a plurality of structured documents is retrieved and classified on a real time basis.

16 Claims, 18 Drawing Sheets

PROPERTY SHEET 1500

PROFILE:/DYNAMIC-CLASSIFICATION-FOLDER
/COMPANY CC

RETRIEVAL OBJECT: /DYNAMIC-CLASSIFICATION-FOLDER

RETRIEVAL CONDITION: (APPLICANT=COMPANY CC)

AND 

CLASSIFICATION ATTRIBUTE: PUBLICATION YEAR

FIG.15

PROPERTY SHEET 1600

PROFILE:/DYNAMIC CLASSIFICATION FOLDER
/COMPANY CC/1987

RETRIEVAL OBJECT: /DYNAMIC-CLASSIFICATION-FOLDER/COMPANY CC

RETRIEVAL CONDITION: (PUBLICATION YEAR=1987)

AND 

CLASSIFICATION ATTRIBUTE:

FIG.16

STRUCTURED DATA CLASSIFICATION DEVICE

BACKGROUND OF THE INVENTION

1. Field of the Invention

The present invention relates to structured data classifying devices which retrieve and classifying structured data and more particularly to a structured data classification device capable of easily classifying structured data in accordance with the purpose of a user.

2. Description of the Related Art

As a device for storing, classifying and arranging a large amount of electronic documents, file systems and document data bases are known at present and used in many offices. In this connection, FIG. 21 shows an example of a classification structure which is created by arranging documents with a certain classification standard. The classification standard in this example comprises a classification for a large group which is, for example, "kind of documents" such as "monthly journal", "report" or "order document", and a classification for a small group which is, for example, "creation date of a document" such as "month and year" In this classification structure, the large-group classification, "kind of documents", is immediately subordinate to a "root", the smaller classification, "creation date of a document" is immediately subordinate to "kind of documents", and actual documents are immediately subordinate to "creation date of a document".

When it is desired to search documents for each "creation date of a document",it is necessary to search all of the documents for each "kind of documents For example, referring to FIG. 21, in order to search all documents classified as "January, 1991",it is necessary to search documents classified as "January 1991" in the small-group classification 2110A, 2120A, and 2130A respectively subordinate to "monthly journal" 2110, "report" 2120 and "order document" 2130. When it is desired to search documents for a new classification standard such as "author",it is necessary for all the documents to be search and to be re-classified.

In document databases and electronic filing systems, there is provided an area in which keywords or attributes can be written in documents. By using the keywords or attributes, it is possible to retrieve documents and to pick up only desired documents by using retrieval query.

Known other similar devices are disclosed in Japanese Patent Laid-open Applications Sho 63-157229 and Hei 1-189721.

The Laid-open Application Sho 63-157729 discloses a device which re-displays documents, as if they were re-classified, by selecting a classification from a plurality of predetermined classifications, using attributes and keywords. The Laid-open Application Hei 1-189721 discloses a device which selects some of beforehand prepared classification axes to thereby display the position of a desired document in the manner of multi-dimensional display.

However,the conventional document databases and electronic filing systems including the devices disclosed in these Japanese Laid-open Application have the following problems:

(1) Attributes or keywords must be added to documents. It requires a great amount of time and labor to add attributes or keywords to documents. It is not possible to re-classify the documents without addition of attributes or keywords.

(2) Although documents are updated, attributes and keywords are not automatically updated because the contents and attributes of a document are separately managed. A known method to avoid this problem is the retrieval over the whole document and extraction of keywords. In this method, however, unintended documents are also retrieved, causing the loss of time. As the number of unintended documents increases, time and labor for retrieval increase.

(3) The retrieval query must be rewritten many times. Conditional retrieval is employed when the attribute values and keywords are clear. However, when a target document cannot be identified by its attributes or keywords, or when the retrieval is for the first time, the attribute values and range of the retrieval query are likely to be changed in trial and error manner. Thus, the retrieval query must be rewritten many times, which requires a large amount of work and time.

(4) Maintaining classification according to classification items requires a large amount of work. Maintenance of classification items to classify/arrange documents is left to the user. For example, when the "reports for January 1991" are to be searched in a structure shown in FIG. 22, only a person who stored the document can know which of "January 1991" at 2210 and "report" at 2220 should be searched. It is possible to store a document at a place which is not related to that document. A large amount of work is required for maintaining the documents.

(5) It requires a large amount of work to classify documents beforehand. In the devices disclosed in the Japanese Applications Sho 63-157229 and Hei 1-189721, the classification items could be replaced to "kind of documents" and "creation date" To this end, all the documents must be classified beforehand with every possible classification items.

SUMMARY OF THE INVENTION

It is an object of the present invention to provide a structured data classification device capable of easily classifying structured data in accordance with the purpose of a user.

In order to achieve the above object, in one aspect of the present invention, a structured data group designated by the classified data group designating means is classified by the classifying means on the basis of a classification data designated by the classified data designating means. Thus, structured data groups are classified in accordance with classification data according to a classification purpose.

In another aspect of the present invention, a structured data group designated by the retrieved data group designating means is retrieved by the retrieving means on the basis of a retrieval data designated by the retrieval data designating means. The results of the retrieval by the retrieving means are classified by the classifying means on the basis of the classification data designated by the classification data designating means. Thus, the structured data group is retrieved in accordance with retrieval data satisfying the retrieval purpose and the structured data group retrieved is classified based on the classification data according to the classification purpose.

Other objects and advantages of the present invention will be understood by the following detailed description and the accompanying drawings.

BRIEF DESCRIPTION OF THE DRAWINGS

FIG. 15 shows an example of a property sheet of a fine-classifiable virtual folder in the first embodiment;

FIG. 16 shows an example of a property sheet of an unclassified virtual folder in the first embodiment;

DESCRIPTION OF THE PREFERRED EMBODIMENTS

Embodiments of the present invention will be described with respect to the accompanying drawings.

First, a retrieval model of structured data according to the present invention will be described before description of the structure of a structured data classification device according to the present invention. In the following description, a structured document will be described as a structured date.

Figure 2:
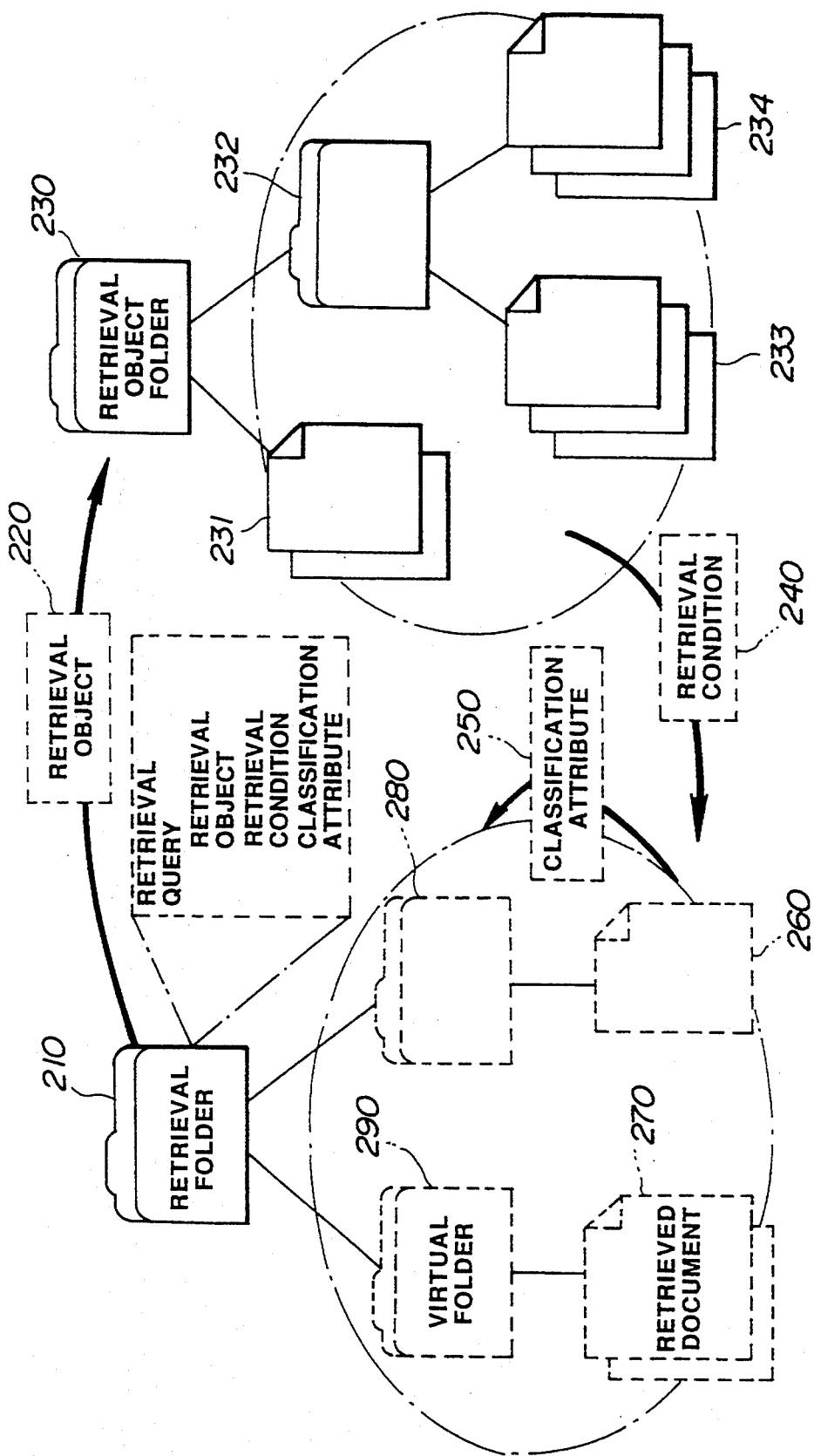
FIG. 2 illustrates a model of retrieval and classification for a structured data according to the present invention.

Referring to FIG. 2, a retrieval folder 210 has retrieval query which comprises a set of "retrieval object", "retrieval condition" and "classification attribute". The "retrieval object" is the name of the folder, that means that all the documents in the folder are to be retrieved. The "retrieval condition" is a logical formula which is expressed by [component's name operator; value]. The "classification attribute" is a component's name which is classified according to the contents of the components of the corresponding structured document.

In this embodiment, the name of a folder is designated as the "retrieval object". However, the retrieval object in this embodiment includes data on a document set (structured documents) to be classified, for example, data on storage such as hard disks or file servers connected to a network data on a file system or a folder name indicative of a folder. The retrieval condition is not requisite and may be omitted.

The retrieval/classification will be outlined below. As shown in FIG. 2, among documents present in a retrieval object folder 230 having a folder name "retrieval-object" represented by an retrieval object 220, and, in this case, a document set 231 in the retrieval object holder 230 and document sets 233 and 234 subordinate to a folder 232 in the folder 230, only documents satisfying retrieval condition 240 are retrieved (selected). The retrieved documents are classified into subsets 260 and 270 in accordance with the contents of the component represented by a classification attribute 250. The classified subsets are displayed on corresponding virtual folders 280 and 290. The virtual folder has no entity of a folder. It is a view which represents the result of the retrieval/classification in the form of a folder.

That is, in this embodiment, by evaluating the retrieval query of the retrieval folder 210, virtual folders 280 and 290, which are views for display of subset (document set) 260 and 270 as the results of the retrieval and classification, are generated below the retrieval folder 210. To this end, the data structure for presenting the results of the retrieval and classification to the user is such that virtual folders are linked subordinate to the retrieval folder which is a root and documents are linked subordinate to each of the virtual folders. (This structure is referred to as a classification structure in this embodiment). The retrieval folder and the virtual folder are objects for classification and display of documents. Therefore, if the system of display is changed, another object may be introduced.

The difference between the retrieval folder and the virtual folder is that the former is an entity which the user defines while the latter is a view which is updated at each retrieval. Also, the former is a root of the classification structure while the latter is at the intermediate level of the classification structure (the lowest level object of the classification structure is a document).

In order to use the same interface as the conventional file system, the "virtual folder" is introduced as a tool for classification. The virtual folder has a retrieval query and shows a document set satisfying the retrieval condition as if the document set is in the virtual folder. By generating the virtual folder, classification of documents satisfaction given conditions conforming to the user's object is realized.

As described above, according to the present invention, a large amount of documents are classified automatically and shown to the user on the conventional hierarchical file system in accordance with the user's purpose.

Referring back to FIG. 1, a structured document storing unit 110 stores documents (structured documents) and a folder which posses documents. Every stored documents or folders can be taken out by an identifier or name from the storing unit 110.

The retrieval condition designating unit 120 designates data required for retrieval, more specifically, the standard documents and/or folders (to be retrieved) stored in the structured document storing unit 110 and retrieval condition ("retrieval object" and "retrieval condition" in the retrieval query above mentioned). The designated data is input to a structured document retrieving unit 130.

The retrieving unit 130 retrieves the contents of the documents designated by the retrieval condition designating unit 120 in the structured document storing unit 110 to obtain a document satisfying the retrieval condition. For example, in FIG. 2, a subset group having subsets of documents 260 and 270 satisfying retrieval condition 240 (in this case, not classified like the subsets 260, 270 shown in FIG. 2 and a random document set) are retrieved from document sets 231, 233 and 234 present in the retrieved object folder 230 designated by the retrieval object 220.

The classification attribute designating unit 140 designates a component's name (classification attribute) which is data necessary for classification (designates "classification attribute" in the retrieval query). The designated data is input to the structured document classifying unit 150. The number of classification attributes designated may be one or more.

When one classification attribute is designated, one component is marked and used as a classification attribute to classify the document sets in retrieval to thereby generate a classification structure.

When a plurality of classification attributes are designated, classification is repeated which depends on the contents of a document corresponding to components which in turn correspond to a plurality of component's names to thereby generate a hierarchical partial structure. That is, the classification attributes are sequentially evaluated one by one to recursively continue the classification to thereby generate a hierarchical classification structure.

The classified documents can be displayed without generation of a classified structure, so that the classification structure is not required to be generated. However, in this embodiment, description will be made on the assumption that a classification structure will be generated. An indication performed when no classification structures are generated will be described later.

The structured document classifying unit 150 classifies documents, retrieved by the structured document retrieving unit 130, in accordance with the contents of document corresponding to the component's name designated by the classification attribute designating unit 140 and generates a classification structure on the basis of those classified documents. For example, in FIG. 2, a subset group is classified into subsets 260 and 270 in accordance with the classification attribute 250 and generates virtual folders 280 and 290 and hence a classification structure.

The display unit 160 displays the classification structure generated by the structured document classifying unit 150 and part or all of the documents retrieved by the structured document retrieving unit 130.

In the first embodiment, the operation for retrieval/classification can be performed in the desk top environment. If an icon-displayed folder (folder icon) is doubly clicked with a mouse button, the documents in a folder corresponding to the folder icon and other folders (for example, virtual folders) can be viewed.

A property key is depressed beforehand to open a property sheet to set the retrieval query with that property sheet in the retrieval folder. Setting the retrieval query is made by the retrieval condition designating unit 120 and the classification attribute designating unit 140. When double clicking is made at this time, a document whose conditions are selected and the generated virtual folder can viewed. When no retrieval queries are set beforehand in the retrieval folder, the property sheet is only opened directly before retrieval and no retrieval is performed. Therefore, the system requires the user to input the retrieval queries.

Figure 1:
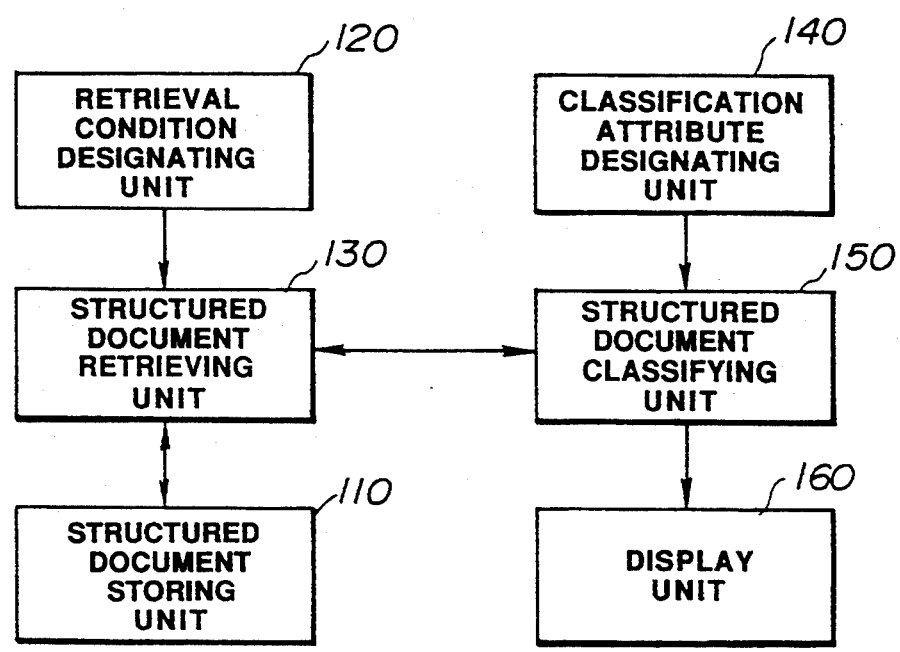
FIG. 1 is a block diagram illustrating the functional configuration of a structured data classifying device according to the first embodiment of the present invention.
Figure 3:
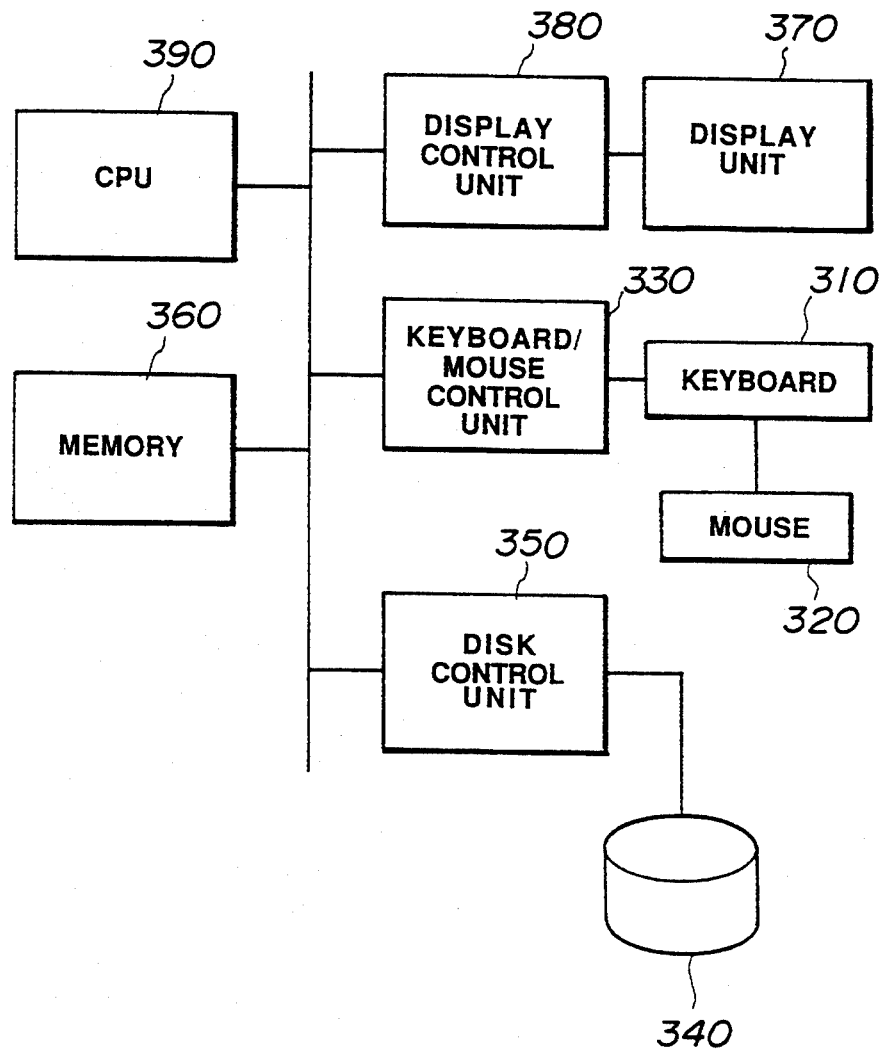
FIG. 3 is a block diagram of the structure of the device of FIG. 1.

FIG. 3 is a block diagram of hardware used for realizing the device of the embodiment of FIG. 1. In FIG. 3, a keyboard 310 is used to key in the retrieval queries, various data and various commands. The mouse 320 selects a desired object such as an icon or folder. A keyboard/mouse control unit 330 controls the inputting of data through the keyboard 310 and mouse 320. A disk device 340 is, for example, a file system, a file server, a magnetic disk device or an optical magnetic disk device which stores groups of structured data, structured documents, data base, various data or various programs. A disk control unit 350 controls access to the disk device 340.

A memory 360 stores data input by the keyboard 310 and mouse 320 and data and/or programs loaded by the disk device 340. The display 370 displays various data such as various proper sheets which include ones for inputting the above-mentioned retrieval queries and various windows. A display control unit 380 causes the display 370 to display the above data. A central processing unit (CPU) 390 performs retrieval and classification of structured data groups to control the various control units and memory 360.

The relationship in correspondence between the structured elements of the FIG. 1 block diagram and those of the FIG. 3 block diagram will be described below.

The structured document storing unit 110 shown in FIG. 1 corresponds to a disk device 340 shown in FIG. 3; the retrieval condition designating unit 120 and the classification attribute designating unit 140 together to the keyboard 310 and the mouse 320 shown in FIG. 3; and the display unit 160 to the display 370.

The structured document retrieving unit 130 and the structured document classifying unit 150 shown in FIG. 1 are realized by the CPU 390 which executes the software (program) which serves the respective functions of those units. More particularly, the structured document retrieving unit 130 is realized by the CPU 390 which loads from the disk device 340 to the memory 360 and executes a program which serves the function of the retrieving unit 130, i.e., a program which identifies the respective elements, which constitutes the stored structured document, with the name of the designated component and which retrieves the contents of the document corresponding to that name of the component. The structured document classifying unit 150 is realized by the CPU 390 which loads from the disk device 340 to the memory 360 and executes a program which executes the function of the classification unit 150, i.e., refers to the structure and contents of a document as the result of retrieval by the structured document retrieving unit 130 and classifies the document in accordance with the contents of the document. Of course, this may be realized by firmware or hardware.

The CPU 390 controls access to the structured document storing unit 110, input to the retrieval condition designating unit 120 and classification attribute designating unit 140 and output to the display unit 160.

First, when the user designates the inputting of a retrieval query, the structured document classifying unit 150 displays on the display unit 160 a window which includes two items "retrieval object" and " classification attribute name" to urge the user to input the two items. In response to this, the user inputs the retrieval query by setting values for the two items (step 410). The name of the folder which holds the document set which is the object to be classified is entered into the item "retrieval object" while the name of the attribute which is a key to classification ( component's name) is entered into the item "classification attribute name"

The structured document classifying unit 150 determines whether the classification attribute is designated in the retrieval query (step 420).

When the classification attribute is designated at step 420, the structured document classifying unit 150 takes from the target document of the document set an attribute value corresponding to the attribute name (component's name) set in the item "classification attribute name",prepares a set of the attribute values and the document which contains the component to which the attribute value is added (step 430), collects documents having the same attribute value to prepare a set of the attribute value and document set for each attribute value (shed 440), sorts the resulting sets of attribute value and document set in sequence of attribute value, and sorts the document sets (step 450).

The structured document classifying unit 150 assumes the sets of attribute value and document set obtained at step 450 as a virtual folder to prepare a virtual folder corresponding to the attribute value, inserts the corresponding document into the prepared virtual folder, and handles the name of the virtual folder as an attribute value (step 460).

The structured document classifying unit 150 sets the virtual folder created at step 460 as if it existed in the folder designated as the object. It sets the folder designated as the object such that when the folder is opened, the virtual folder is displayed (step 470) and then returns to step 420 to execute step 420 and seqq.

When the classification attributes still remain at step 470, the structured document classifying unit 150 performs step 430 and seqq., on the virtual folder created at step 460 for the next classification attributes. If there remain no classification attributes at step 470, the structured document classifying unit 150 outputs the created virtual folder and the classified document to the display unit 160 (step 480).

The respective steps of the classification will next be described by way of a specified example.

Now assume that 8 documents present in a folder F and described below are classified with an attribute X.

Let the documents present in the folder be notated as "folder name {document name, document name . . . }". Then, we obtains:

Folder F {B1, A3, C2, A2, C1, A4, A1, B2}. [Step 410]

A window for setting the retrieval query is displayed to urge the user to input "retrieval object" and "classification attribute name"

In response to this, assume that the user has made the following setting:

(1) the retrieval object ="F" and
(2) the classification attribute name ="X".

[Step 420]

The processing at steps 430-470 is executed on the document set in the folder F for the classification attribute X.

[Step 430]

If a set of attribute value and document is notated as "(attribute value, document name)",the following attribute values are obtained and sets of attribute value and document are prepared:

(b, B1), (a, A3), (c, C2), (a, A2),
(c, C1), (a, A4), (a, A1), (b, B2)

where a, b and c each denote an attribute value corresponding to the classification attribute name="X",A1-A4 each are the name of a document which contains an attribute value a, B1 and B2 each are the name of a document which contains an attribute value b, and C1 and C2 each are the name of a document which contains an attribute value c.

[Step 440]

If a set of attribute value and document is notated as "([attribute value, {document name, document name . . . }])",a document is arranged for each attribute as follows:

[b, {B1, B2}], [a, {A3,A2,A4,A1}],
[c, {C1, C2}],

[Step 450]

When sets of attribute value and document set created at step 440 sorted, the following is given:

[a, {A1, A2, A3, A4}], [b, {B1, B2}],
[c, {C1, C2}].

[Step 460]

In order to make a set of attribute value and document set a virtual folder, virtual folders a, b and c are created:

a virtual folder a {A1, A2, A3, A4},
a virtual folder b {B1, B2},
a virtual folder c {C1, C2}.

[Step 470]

If folders in a folder are norated as "folder name {folder name, folder name . . . }similarly to the document, the following is obtained:

folder F
virtual folder a {A1, A2, A3, A4},
virtual folder b {B1, B2},
virtual folder c {C1, C2}

This appears as if there were virtual folders a, b and c in the folder F.

[Step 480]

folder F virtual folder a {A1, A2, A3, A4},
virtual folder b {51, 52},
virtual folder c {C1, C2} is displayed in a tree structure or a list structure.

Figure 5:
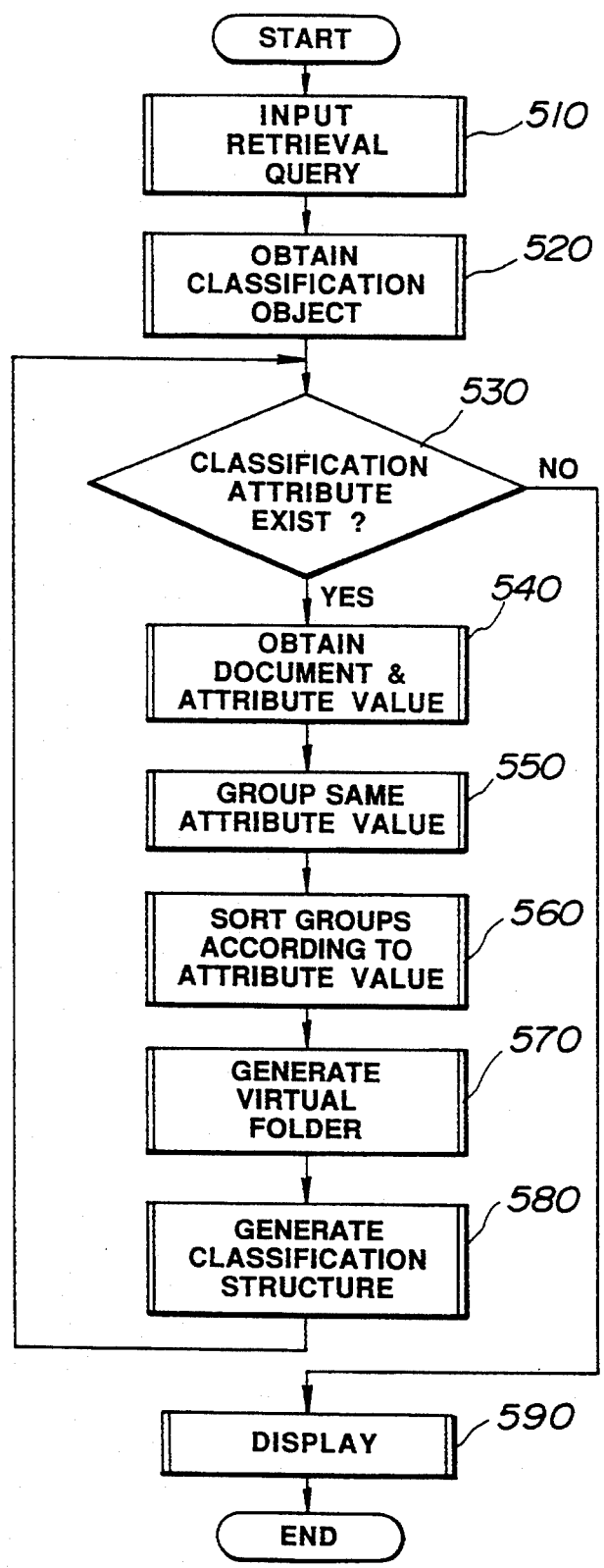
FIG. 5 is a flowchart illustrating another example of the classifying operation in the first embodiment.

When a classification object is determined, not the retrieval object, but a conditioned retrieval object may be an object to be classified. Thus, excess documents are required to be neither classified nor referred to. The processing performed at this case will be described with respect to the flowchart shown in FIG. 5.

At first, when the user instructs the structured document classifying unit 150 to input a retrieval query, the classifying unit 150 displays a window containing three items "retrieval object"," retrieval condition","classification attribute name" and urges the user to input the three items. In response to this, the user sets values at the three items to input the retrieval query (step 510). Matters similar to those at step 410 are entered into the items "retrieval object" and "classification attribute name" The conditional formula for the classification object is entered into the item "retrieval condition" A document suitable for the retrieval condition is selected among the document set to be retrieved and a document set to be classified is generated (step 520).

Figure 4:
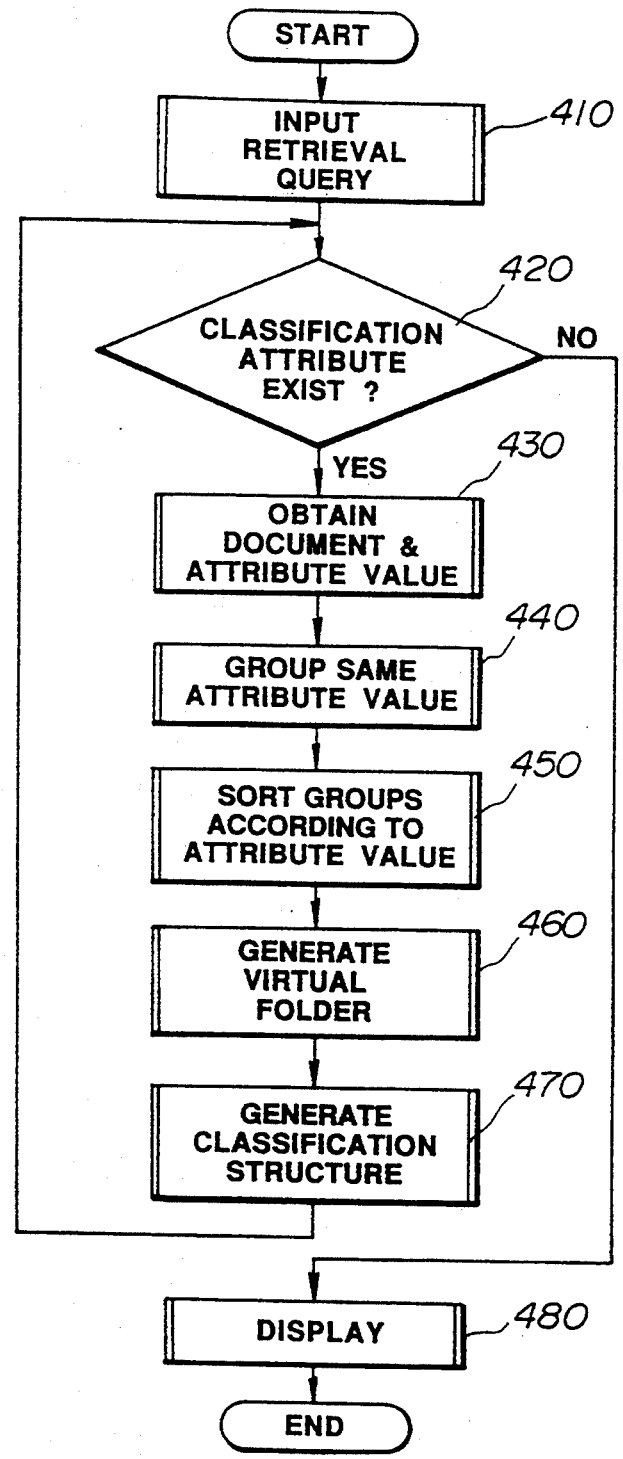
FIG. 4 is a flowchart illustrating an example of classifying operation in the first embodiment.

The processing at step 520 seqq. is performed similarly to steps 420–480 shown in FIG. 4 (steps 530–590).

The retrieval/classification of the above-mentioned structured documents will be described specifically with respect to FIG. 6–18.

Figure 6:
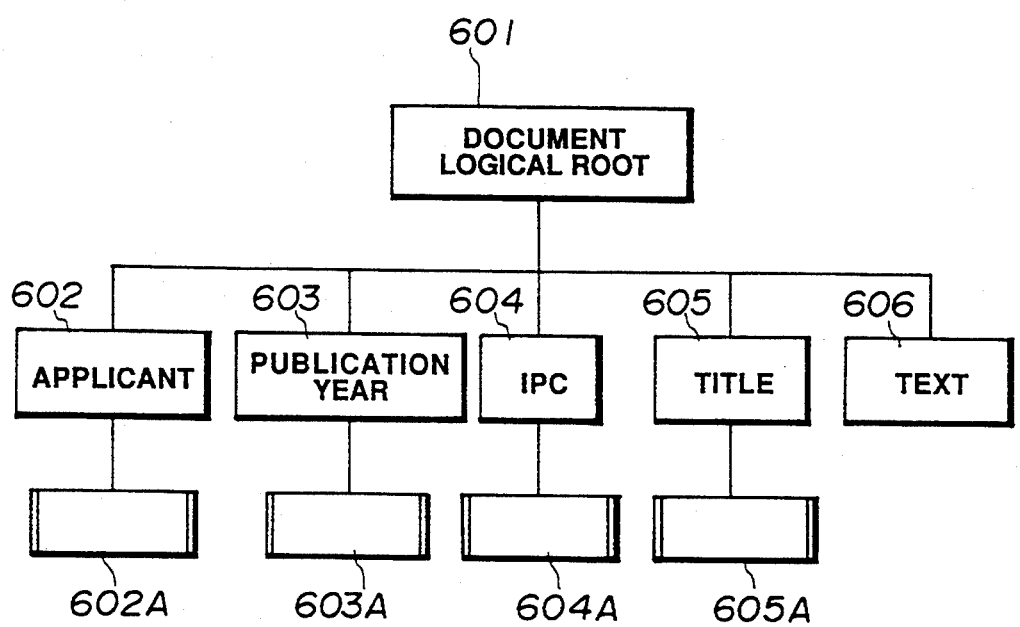
FIG. 6 shows an example of a structured document stored in a structured document storing unit in the first embodiment.

FIG. 6 shows one example of a structured document stored in the structured document storing unit 110 and composed of respective components which constitute a logical structure of a document, the content and names of the components of the document corresponding to the components, and a logical object composed of the components. In FIG. 6, reference numerals 601–606 denote the respective components constituting the logical structure and more particularly reference numeral 601 denotes a "document logical root". Reference signs 602A–605A denote the contents of the document. In addition, "applicant","publication-year","international-patent-classification", "title" and "text" are the component's names corresponding to the components. Since the structures of the component 606 of the "text" seqq. are complicated, further description thereof will be omitted here.

The contents of the document corresponding to the component's name of "applicant" are the names of applicants such as, for example, "company AA" or "company BB". The contents of the document corresponding to the component of "publication-year" are years where an application is published, for example, "1987" or "1988". The contents of the document corresponding to the component's name of "international-patent-classification" are international-patent-classifications (IPC) such as, for example, "G06F 15/20","G06F 7/00".

In this embodiment, it is assumed that a plurality of structured documents which contain at least the components "applicant","publication-year" and "international-patent-classification" are stored, for example, in "US-Japan patent folder". Of course, other structured documents may be stored in the file.

Retrieval of a document having a logical structure of an article such as that shown in FIG. 7 will be described below.

In the shown structure, several ones of the components constituting the logical structure of the document, i.e., "table of contents","header","text","thanks","list of references" and "appendix" are connected to below "document logical root". Connected to below "header" are "title", "author" having "its position" and "author's name",and "date of creation" In addition, connected to below "list of references" is a "reference" to below which are connected "title","author's name","source" and "publication-year" This document has two components of each of "author's name" and "title".

When a document having a plurality of the same component's name, as just mentioned above, is retrieved, precise result of retrieval cannot be obtained even if only the component's name is designated as the classification attribute because if the contents of the document are referred to only with the component's name, the author's name appearing in the reference as well as the author's name for an article are "author's name" as the component and it cannot be determined whether "author's name is for the reference or for the article.

If a document is desired to be retrieved by distinguishing the author of an article and that of a reference from each other, the user uses the sion "/" to set as a classification attribute data indicative of the relationship in hierarchy between the components. For example, in the case of the structure shown in FIG. 7, the user sets the classification attribute in the name of "header/author/author's name" if the author of the article is involved. If he sets a classification attribute in the name of "list of references/references/author's name" if the author of the reference is involved.

Thus, the structured document classifying unit 150 refers to the classification attribute to specify as the attribute value the "author's name" below "header"or "author's name" below "list of references" The user can distinguish the author's name of a reference and that of an article from each other.

Figure 7:
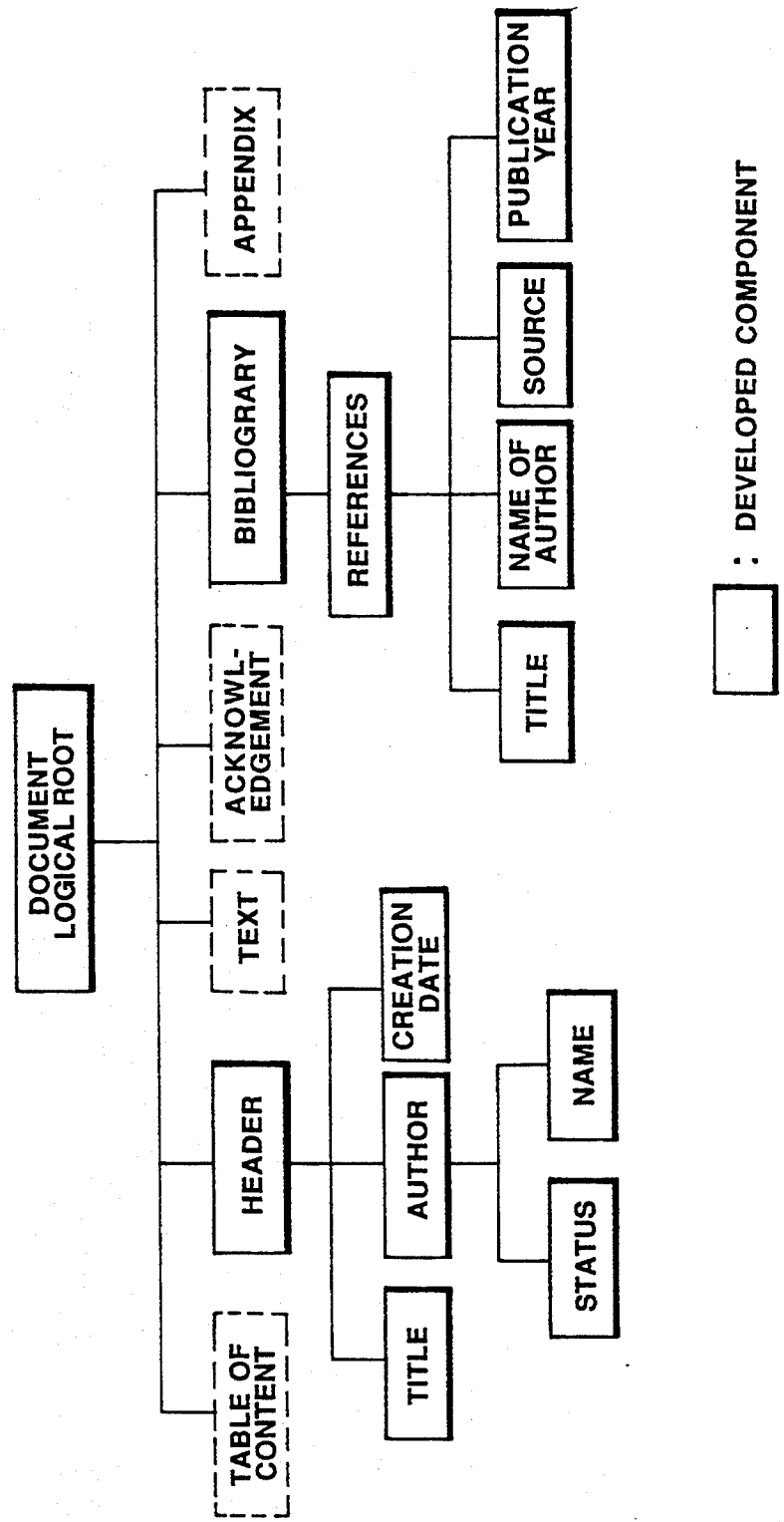
FIG. 7 shows another example of a structured document shored in a structured document storing unit of the first embodiment.

In the structure shown in FIG. 7, it can be determined for the component "title" whether the component "title" is for a reference or an article by setting as the classification attribute data indicative of the hierarchical relationship of the components, similarly to the above.

Appropriate contents of a document can be referred to like an attribute value by designating the name of the component as if it were the name of an attribute, as mentioned above.

The reason why in this embodiment the component of a document is managed with its name when the document is stored and retrieved will be described below.

When the document is managed by addition of an attribute thereto for retrieving purposes, discrepancy can occur in the contents and attribute of the document due to update of the contents of the document. Thus retrieval of the document is preferably performed using the contents of the document directly. However, mere retrieval of all the documents results in mere retrieval in the form of a character string even if the user desires to retrieve a document, for example, with "date of creation" Therefore, retrieval must be made by referring to character strings present in the contents of the document which are not related to "date of creation" such as "text" or "acknowledgement". If a character string indicative of the date is retrieved, it is not necessarily the "date of creation".

In order to avoid this problem, the contents of a document inherent to a component of the document are referred to by the use of the component's name given to the component. This causes the given component's name and the contents of the document inherent to the component to correspond to each other, so that even if the contents of the document are updated, the corresponding component's name can be set as the classification attribute to retrieve the updated contents of the document.

Thus, in this embodiment, the component of a document is managed by name (component's name) in the retrieval of a document.

Figure 8:
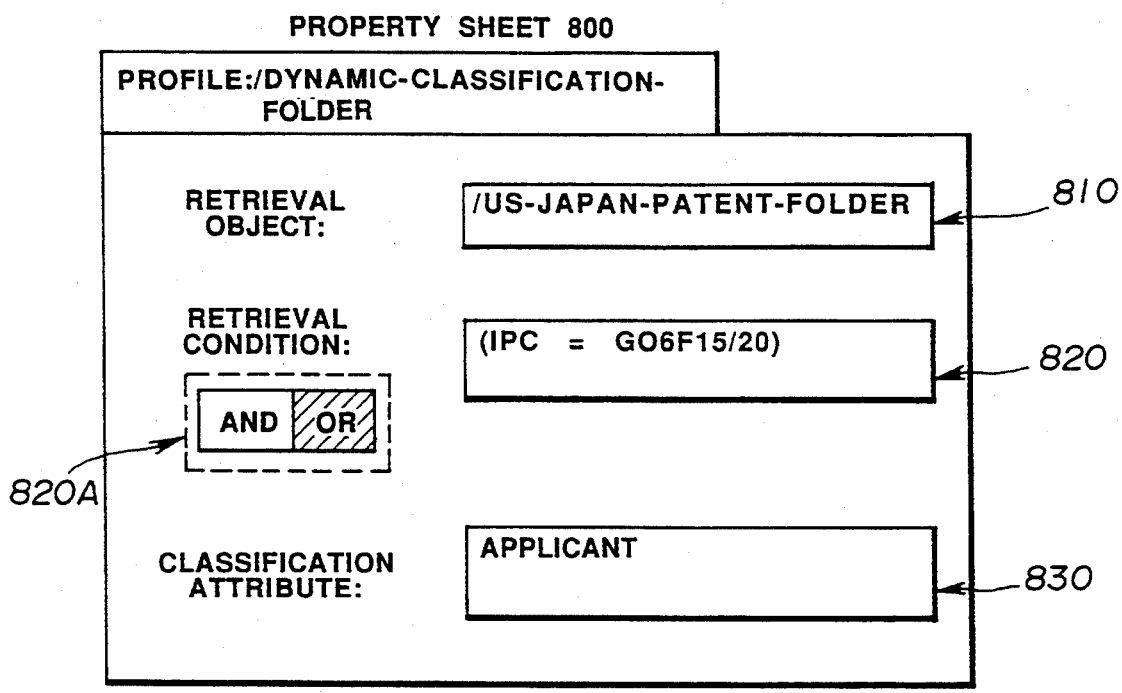
FIG. 8 shows an example of a property sheet of a retrieval folder for designating a retrieval query in the first embodiment.

FIG. 8 shows a property sheet 800 of a retrieval folder for designation of a retrieval query composed of "retrieval object", "retrieval condition", and "classification attribute" The property sheet 800 is provided with fields 810 and 820 for designation of "retrieval object" and "retrieval condition (retrieval query)", respectively, required for retrieval of a structured document, a field 830 for designation of "designation attribute" as a classification item for automatically classifying the document, and a button 820A which if a plurality of conditional formulas is designated corresponding to "retrieval condition", selects any one of "logical OR" and "logical AND" operations on the plurality of conditional formulas (The conditional formula may be a complicated one, but takes the form of a simple expression in order to simplify the user interface).

When the "retrieval object" is designated, the name of a folder is designated in the field 810, which means that a document set which has as elements all the documents present in a folder corresponding to the designated folder name is to be retrieved. In the designation of "retrieval condition", conditional formulas necessary for a target document of the document set indicated by "retrieval object" are entered into the field 820. When a plurality of conditional formulas is set, the mouse is operated to move the cursor into any one of "AND" and "OR" regions and a mouse button provided on the mouse 320 is clicked to select one of the "OR" and "AND".

The format of the conditional formula is "(component's name, operator, value)" The evaluation of the conditional formulas is performed by substituting the contents of a component of the document into " the component's name of the conditional formula" and evaluating the operator. The conditional formulas are logical ones and a document which has become "true" is selected.

Last, in the designation of "classification attribute",-classification items or attributes necessary for classification of a document set obtained by designation of "retrieval object" and "retrieval condition" are entered into a field 830. The documents are classified into subsets according to the contents of the component designated by the "classification attributes" In addition, virtual folders corresponding to the subsets are created automatically.

It is assumed here that, as shown in FIG. 8, the user designates "US-Japan-paten-folder" as the name of a folder in the field 810, enters (international-patent-classification =G06F 15/20) as the conditional formula into the field 820, designates the "OR" of the button 820A, and enters "applicant" as the component's name (classification name) into the field 830.

When the retrieval query is designated in this way, the structured document retrieving unit 130 retrieves from the structured document storing unit 110 the "US-Japan-patent-folder" corresponding to the folder name designated in the field 810 and retrieves from the set of structured documents in "US-Japan-paten-folder" a document satisfying the conditional formula "international-patent-classification=G06F 15/20" designated in the field 820. At this time, only a structured document is retrieved which has a component corresponding to the same component's name as the designated conditional formula "international-patent-classification". For example, by referring to the contents of a document 604A corresponding to the component 604 of the structured document shown in FIG. 6, it can be determined whether the appropriate document is a document to be a retrieved. It is assumed here that a plurality of documents is retrieved. The respective retrieved structured documents are sent to the structured document classifying unit 150.

The structured document classifying unit 150 receives the documents and classifies them in accordance with the clarification attribute "applicant" designated in the field 830, and forms the classified documents into subsets of parts of the documents. The classification at this time is performed in accordance with the contents of the document corresponding to the component represented by the same component's name as the designated "applicant". For example, fine classification may be performed by referring to the document contents 602A corresponding to the component 602 of the structural document shown in FIG. 6. Virtual folders are generated in correspondence to the respective classified subsets and a classification structure is then generated on the basis of the subsets and virtual folders. One example of the classification structure will be described in FIG. 9.

Figure 9:
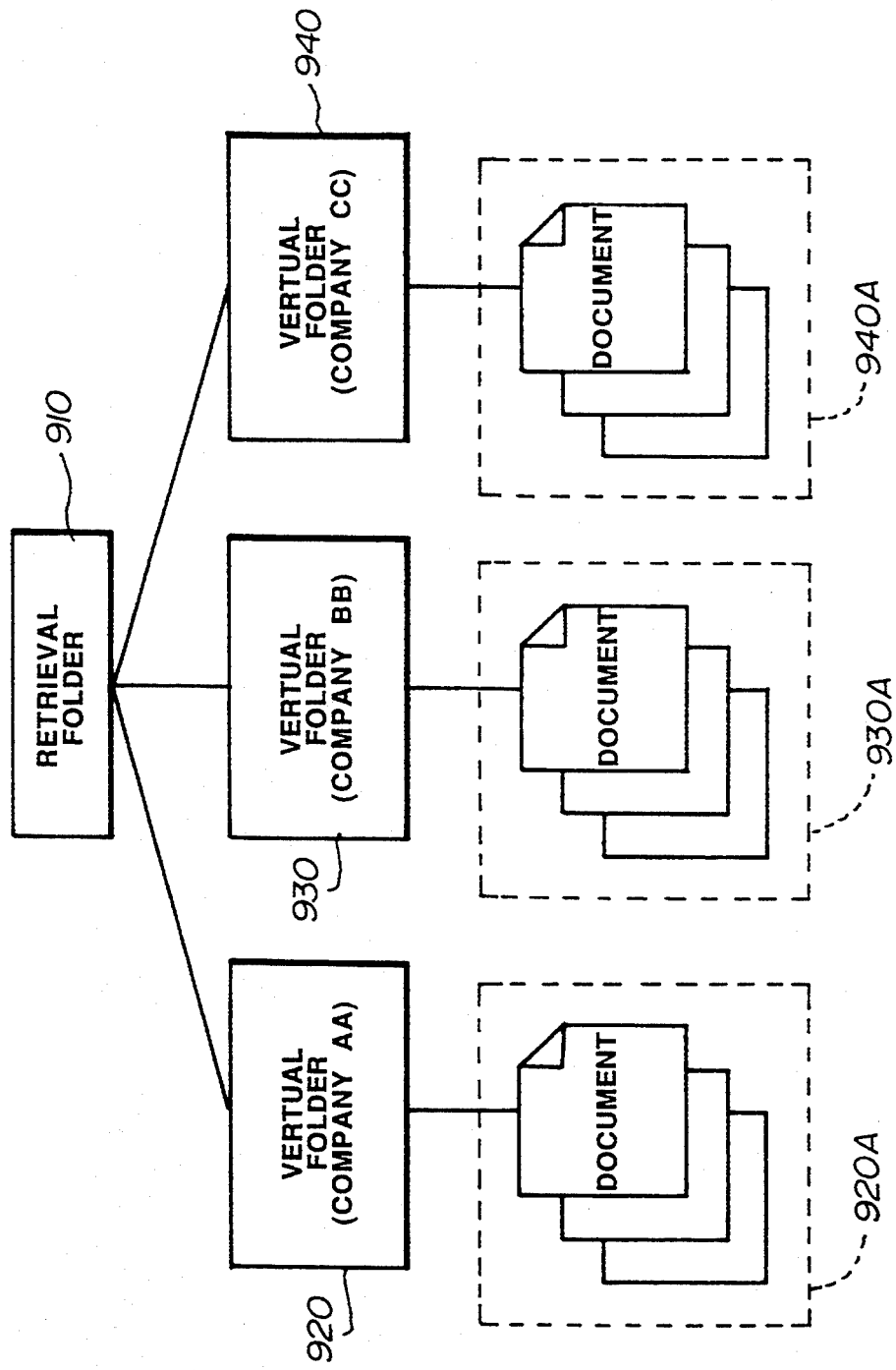
FIG. 9 shows an example of a classification structure generated on the basis of the retrieval query shown in FIG. 8.

In the example of FIG. 9, virtual folders 920, 939, 940 are generated below a retrieval folder 910 which is root, as views which display subsets 920A, 930A, 940A classified corresponding to the respective applicants "company AA", "company BB", and "company CC".

The state shown in FIG. 9 is an internal state showing the state at the completion of processes of retrieval/-classification. To the display unit 160, for example, in a window corresponding to the retrieval folder 910, virtual folder icons indicative, for example, of the corresponding virtual folders 920, 930, 940 and the corresponding names of applicants "company AA", "company BB" and "company CC" are passed. As a result, the virtual folder icons and the names of applicants are displayed on the display unit 160.

A property sheet of a virtual folder in which the retrieval object and retrieval condition are entered to obtain the subsets classified in correspondence to the applicant "company CC" is displayed in the display unit 160 by the user clicking the mouse button provided on the mouse 320 to instruct the virtual folder icon, corresponding to the applicant "company CC", to indicate the property sheet of the virtual folder. One example of the display state is shown in FIG. 10.

Figure 10:
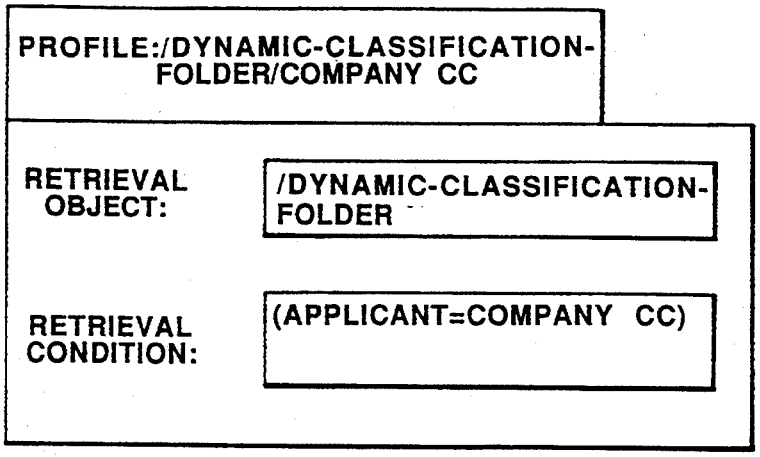
FIG. 10 shows an example of a property sheet of a virtual folder as a view in the first embodiment.

FIG. 10 shows a property sheet (retrieval query) 1000 of the virtual folder (herein the virtual folder "/dynamic-classification-folder/company CC" generated below the retrieval folder "/dynamic-classification-folder") created in corresponding to the document set retrieved/classified. The retrieval object becomes a retrieval folder "/dynamic-classification-folder" and the retrieval condition become "applicant=company CC".

While in the above example one classification attribute is designated by the classification attribute designating unit 140, a plurality of classification attributes may be designated.

A plurality of classification attributes can be entered and the classified documents can finer classified, by enabling "classification attribute" to be entered into the retrieval query without discriminating the retrieval folder and the virtual folder from each other. This causes the hierarchy of classification to be generated dynamically to thereby realize a classification structure. Retrieval/classification performed when a plurality of classification attributes is designated will be described below.

Figure 11:
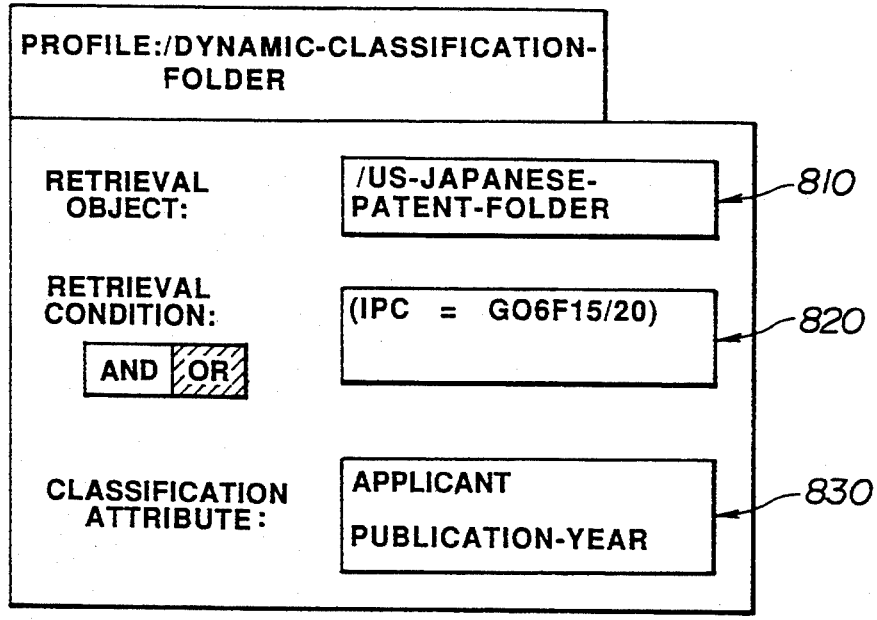
FIG. 11 shows an example of a property sheet of a retrieval folder for designating a retrieval query having a plurality of classification attributes in the first embodiment.

FIG. 11 shows one example of the property sheet of the retrieval folder which designates a plurality of classification attributes. The property sheet 1100 has the same structure as the property sheet 800 of FIG. 8. In the example of FIG. 11, the "applicant" and "publication-year" are designated as the classification attributes in the field 830 corresponding to the classification attributes.

When this retrieval query is designated, the structured document retrieving unit 130 retrieves a document set meeting the conditional formula "international-patent-classification =G06F 15/20" designated in the field 820 among the set of structured documents in the "US-Japan-paten-folder" stored in the structured document storing unit 110, as mentioned above. The document set is reported to the structured document classifying unit 150.

The structured document classifying unit 150 classifies the respective received structured documents into subsets of documents in accordance with the classification attributes "applicant" and "publication" designated in the field 830.

At this time, the retrieved structured documents are classified in accordance with the document contents corresponding to a component expressed by the same component's name as the "applicant". In addition, the document set classified for the respective applicants are , classified in accordance with the document contents corresponding to the component expressed by the same component's name as the designated "publication-year". The sets of finally classified documents become subsets.

The structural document classifying unit 150 generates a virtual folder for display of the document contents classified for each applicant in correspondence to each of the classified subsets and a virtual folder for display of the document contents classified for each publication-year and then forms a classification structure on the basis of the subsets and the respective virtual folders. One example of the classification structure is shown in FIG. 12.

Figure 12:
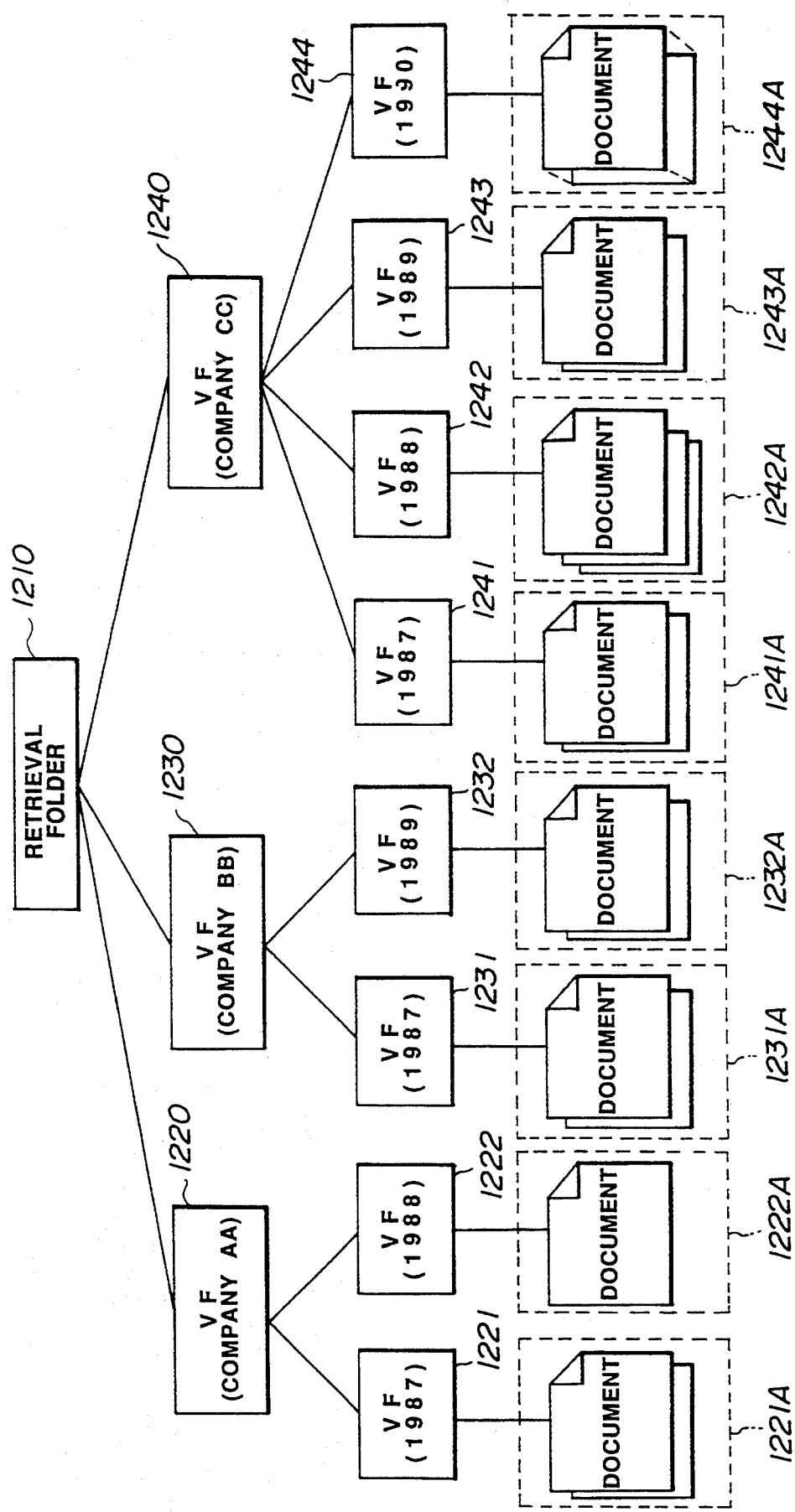
FIG. 12 shows an example of a classification structure generated on the basis of the retrieval query shown in FIG. 11.

In the example of FIG. 12, virtual folders 1220, 1230 and 1240 are generated below the retrieval folder 1210 which is the root. Generated below the virtual folder 1220 are virtual folders 1221 and 1222 as views in order to display subsets 1221A and 1222A. Generated below the virtual folder 1230 are virtual folders 1231 and 1232 as views in order to display subsets 1231A and 1223A. Generated below the virtual folder 1240 are virtual folders 1241–1244 as views in order to display subsets 1241A–1244A, respectively.

When the retrieval/classification is completed in this way, the respective virtual folder icons which display the virtual folders 1220, 1230 and 1240 are displayed on the display unit 160, as mentioned above. When a desired icon, for example, corresponding to virtual folder 1240, is designated among those virtual folder icons, virtual folder icons corresponding to the respective virtual folders 1241–1244 are displayed.

More specifically, double clicking the retrieval folder "/dynamic-classification-folder" opens a window, where a virtual folder icon corresponding to the virtual folder is displayed to display the subset classified for each applicant. One example of that display is shown in FIG. 13.

Figure 13:
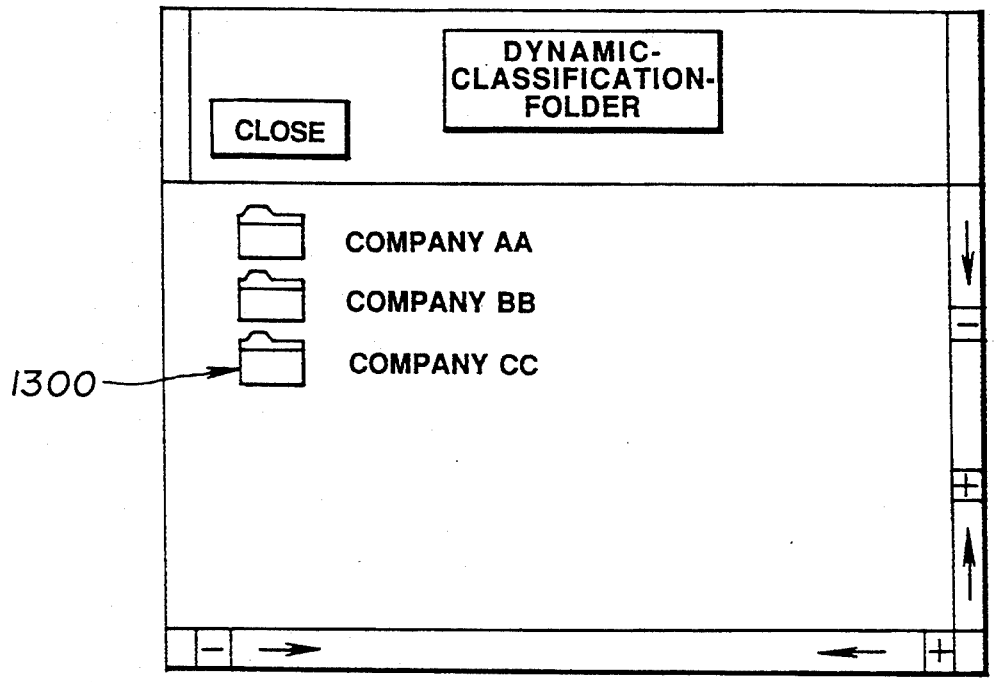
FIG. 13 shows an example of a view of a retrieval folder in the first embodiment.

If, for example, a virtual folder icon 1300 corresponding to a virtual folder (/dynamic classification/company CC) which in turn corresponds to the applicant "company CC " is double clicked in the state of FIG. 13, virtual folder icons corresponding to the virtual folder are displayed to display subsets classified for the respective publication-years. On example of that display is shown in FIG. 14.

For example, double clicking a virtual folder icon 1400 corresponding to "1987" causes a list of subsets (i.e., structured documents) for the applicant "company CC" and the publication-year "1987" to be displayed on the display screen of the display unit 160. Designation of a desired structured document item among the list causes the contents of that document to be displayed.

In order to know how the structured documents are classified, the virtual folder icon is required to be clicked to issue a command to open the property sheet of the virtual folder. For example, by clicking the virtual folder icon 1300 for the "company CC" of FIG. 13 to issue a command to open the property sheet for the virtual folder, the property sheet of a finer-classifiable virtual folder is displayed on the display unit 160. Its display state is shown in FIG. 15. It will be seen from the property sheet 1500 that the retrieval folder, "dynamic-classification-folder",the "applicant=company CC", and the "publication-year" are designated as the retrieval object, retrieval condition and classification attribute, respectively.

Figure 14:
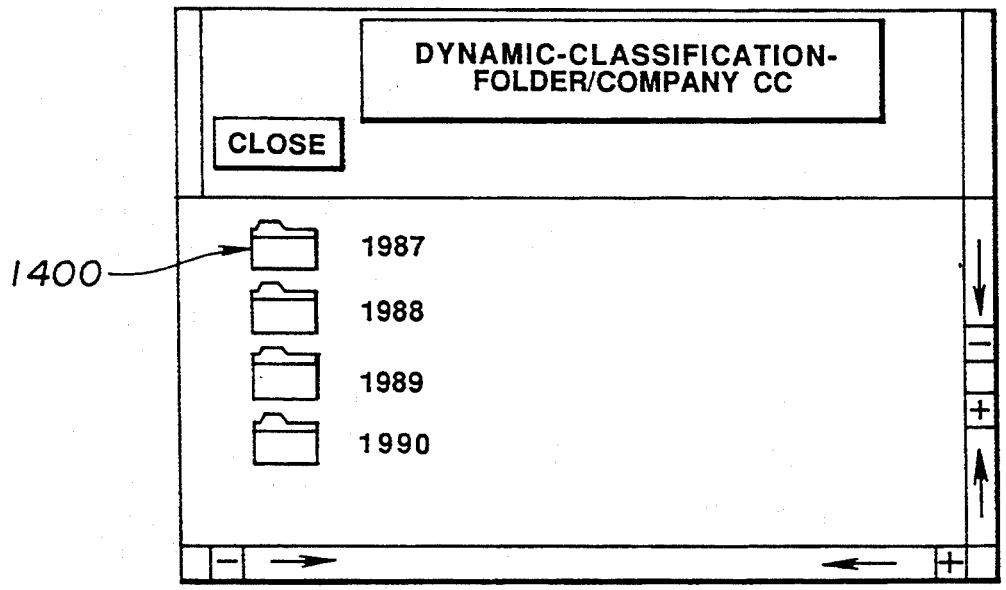
FIG. 14 shows an example of a view of a virtual folder in the first embodiment.

By clicking the virtual folder icon 1400 for "1987" shown in FIG. 14 to issue a command to open the property sheet of the virtual folder, the property sheets of virtual folders which are no longer classified are displayed on the display unit 160. One example of that display is shown in FIG. 16. It will be seen from the property sheet 1600 that the virtual folder, "/dynamic-classification-folder/company CC" and "publication-year=1987" are designated as the retrieval object" and "retrieval condition",respectively.

The virtual folders in hierarchical relationship are sequentially designated and opened to view the target document, as mentioned above.

However, according to this method, the target document cannot be viewed if such operation is not continued until the end of the virtual folder is encountered. In order to avoid this undesirable case, arrangement is provided such that when the retrieval folder icon corresponding to the retrieval folder is double clicked, the structured document classifying unit 150 changes the display form to display on the display unit 160 a window in which a list of document sets is displayed at a lower position and a folder hierarchical structure an upper position. One example of that display is shown in FIG. 17, in which a list of documents present in a "dynamic-classification-folder" (retrieval folder) corresponding to a dynamic-classification-folder icon 1702 is displayed in a list display area 1701 of the window 1700.

Figure 17:
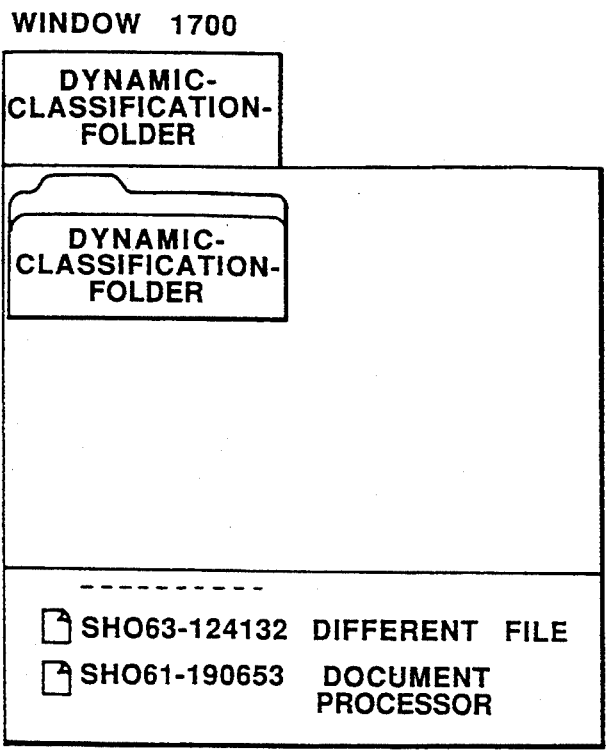
FIG. 17 shows an example of a view of the retrieval folder before retrieval/classification in the first embodiment.
Figure 18:
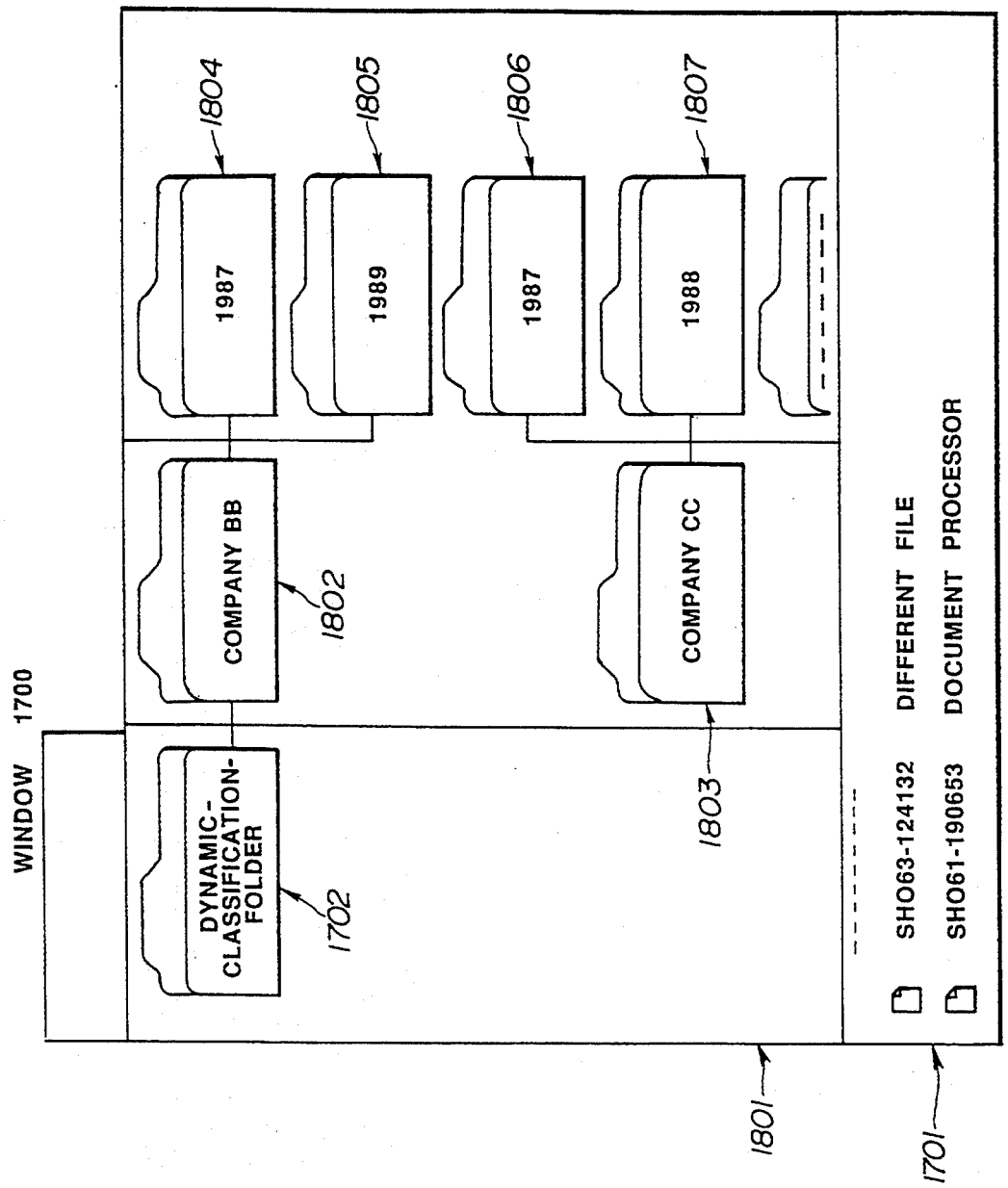
FIG. 18 shows an example of a view of the retrieval folder after retrieval/classification in the first embodiment.

When display of the classification/retrieval is commanded in such display state, the display contents shown FIG. 17 are changed to those shown in FIG. 18 in which a hierarchical structure (classification structure) is displayed in a hierarchical structure display area 1801 of a window 1800.

In this case, a folder icon 1702 corresponds to the retrieval folder 1210 of FIG. 12; a folder icon 1802 to the virtual folder 1230 of FIG. 12; a folder icon 1803 to the virtual folder 1240 of FIG. 12; folder icons 1804 and 1805 to the virtual folders 1231 and 1232, respectively, of FIG. 12; and folder icons 1806 and 1807 to the virtual folders 1241 and 1242, respectively, of FIG. 12.

By selection of any one of icons 1804–1807 at the lowermost level of the displayed hierarchical structure, the contents of the actual structured document corresponding to the element of the hierarchical structure which the selected icon expresses are displayed.

Figure 19:
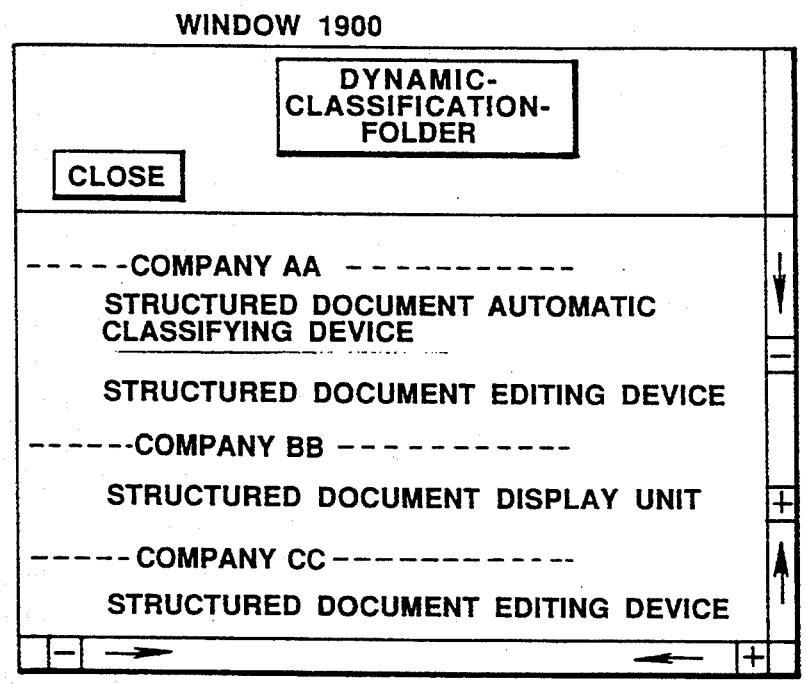
FIG. 19 shows a retrieval folder without a virtual folder in the first embodiment.

FIG. 19 shows an example of display where classified documents and partitions for the classification are displayed in a window for a retrieval folder "dynamic-classification-folder" without generation of a classification structure. As shown in the example of FIG. 19, lists of documents classified for the respective applicants "company AA","company BB" and "company CC" are displayed in correspondence to the those applicants in a window 1900.

Figure 20:
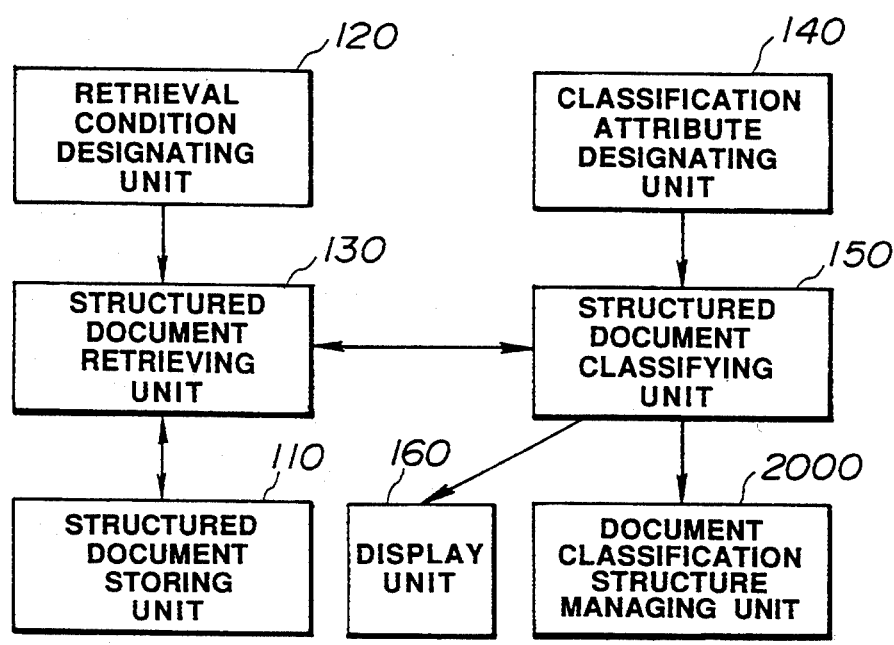
FIG. 20 is a block diagram of a functional configuration of a structured data classifying device according to the second embodiment of the present invention.
Figure 21:
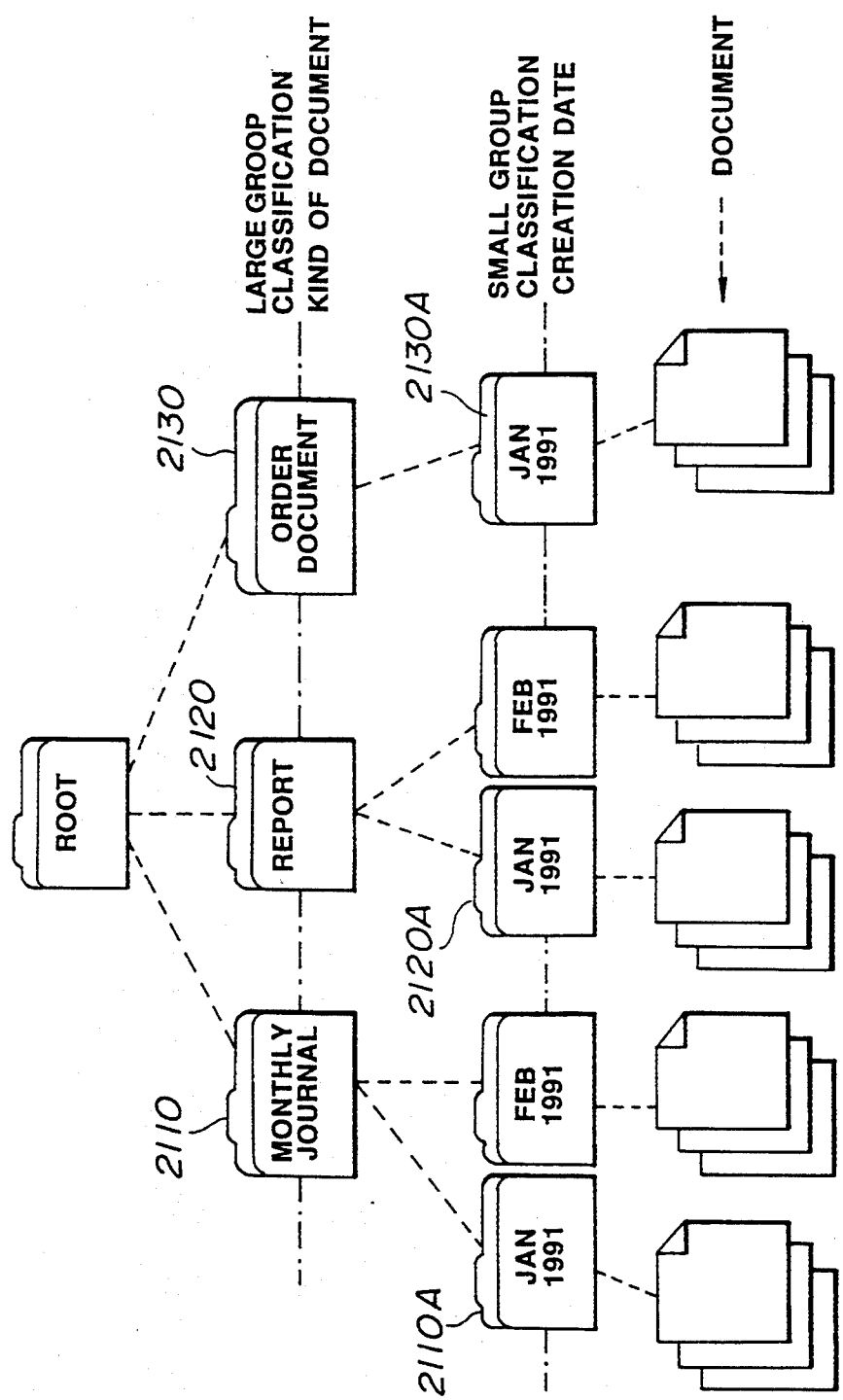
FIG. 21 illustrates an example of classification of a plurality of documents.
Figure 22:
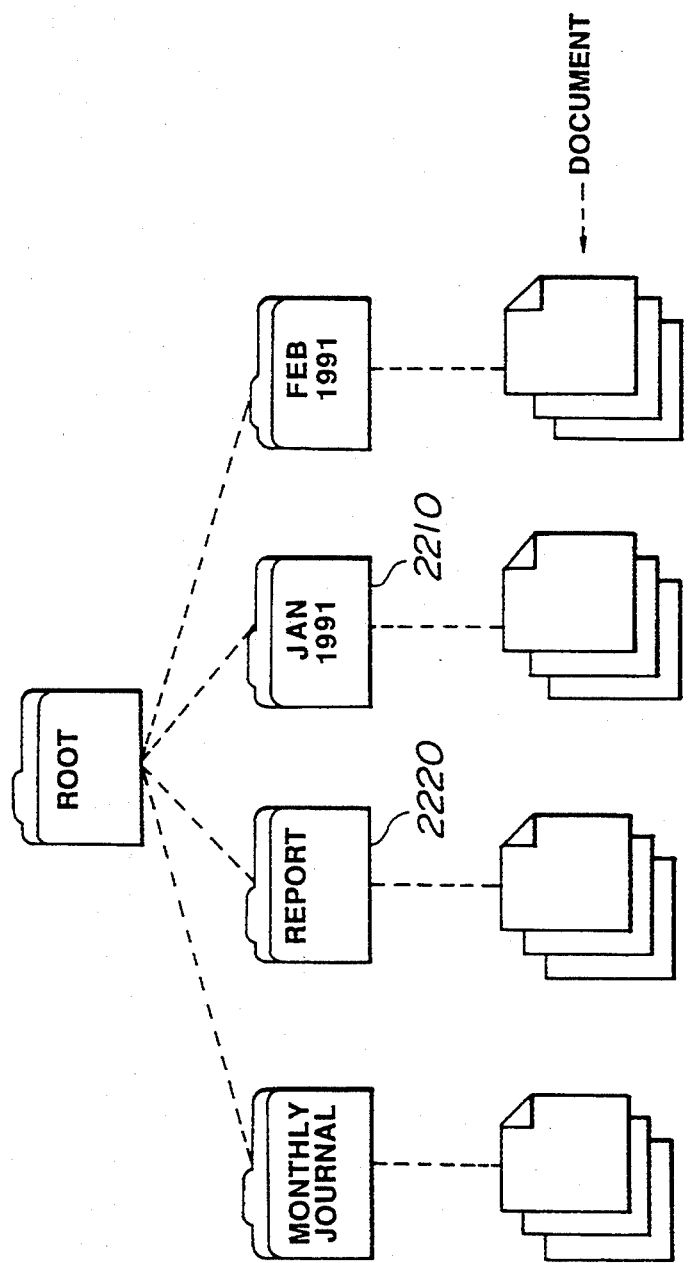
FIG. 22 illustrates another example of classification of a plurality of documents.

FIG. 20 is a functional block diagram of a second embodiment of the structured document classifying device according to the present invention.

This block diagram includes a combination of the structure of the first embodiment shown by its block diagram of FIG. 1 and a document classification structure managing unit 2000. In FIG. 20, an element having the same function as the element shown in FIG. 1 is identified with the same reference numeral as that used for the latter element.

The device of this second embodiment has basically the same functions as that of the first embodiment.

The minimum number of documents is entered in the document classification structure managing unit 2000. The document classification structure managing unit 2000 is actually a data file where fine settings and implicit settings required by the structured document classification unit 150 are entered. Entered in the data file are, for example, storing conditions and/ the timings of retrieval/classification.

Thus, when no classification is required, for example, because a quantity of documents is already small, the quantity of documents becomes small. A command is issued such that when the selected number of documents is less than the minimum number of documents, classification is stopped and no virtual folders are generated and longer at the ends of the hierarchy. An item (component's name) is designated to sort a document set in accordance with the document contents corresponding to that item in consideration of the ease of viewing the contents of the documents in the folders to thereby obtain the target document rapidly.

Several specified examples of the contents of a document entered in the document classification managing unit 2000 will be described below.

(1) Designation of "others" (part 1):

If there is the designation of "others","other" folders are generated and documents are classified together in the folders when the number of documents is smaller than a preset value.

More specifically, assume that, for example, "other: applicant: 5" is designated to the document classification structure managing unit 2000. In this case, if there are, for example, only 4 documents for "company XX" which are to be classified according to applicant, the structured document classifying unit 150 classifies those documents into the "others" whereas if there are, for example, 7 documents for "company AA",they are classified into the virtual folder "company AA".

(2) Designation of "others" (part 2)

If there is the designation of "others",only the documents having a particular attribute are classified and all the inappropriate attributes are classified into the "others"

If, for example, "others: applicant: (company AA, company BB, company CC)" is designated to the document classification structure managing unit 2000, the structured document classifying unit 150 classifies the documents into any one of " company AA","company BB","company CC" and "others" according to applicant.

(3) Designation of plurality-to-one unification:

If there is the designation of "plurality-to-one unification",documents corresponding to the designated plurality of values are classified into the same folder.

For example, if "applicant: group FX: FXXXX, FXIII" is designated to the document classification structure managing unit 2000, the structured document classifying unit 150 classifies either of patents FXXXX and FXIII such that and of these patents are in the same "group FX".

(4) Designation of a range:

If there is this designation of a range, documents meeting a range designated by a conditional formula are classified into the same folder.

If, for example, "publication-year: before '89: publication-year < ='89" is designated to the document classification structure managing unit 2000, the structured document classifying unit 150 preferentially classifies the documents meeting the conditional formula "publication-year < ='89" into the folder "before '89" when classification is made according to publication-year. If, for example, "publication-year: '90 to '91: publication-year ='90/publication ='91" is designated to the document classification managing unit 2000, the structured document classifying unit 150 preferentially classifies documents meeting the conditional formula "publication-year ='90/publication-year ='91" when classification is made by according to publication-year. As just described, a plurality of conditional formulas may be designated.

Modifications (applications) of the first and second embodiments, mentioned above, will be described below.

(1) Re-use of a retrieval query:

A retrieval query once designated is beforehand stored in the structured document storing unit 110. The retrieval query is called by a designating unit (retrieval condition designating unit 120, classification attribute designating unit 140) to eliminate the need for again inputting the same retrieval query. This eliminates a time taken for the user to input the retrieval query.

(2) Improvements to the designating unit:

Selection of "retrieval object" does not designate a folder name, but copies a folder icon. Selection of "retrieval condition" and "classification attribute" in a menu improves the user interface.

(3) An increase in the execution speed:

If no documents are changed, data on the once retrieved classification is stored and again used without retrieval to increase the execution speed. More specifically, data on the retrieval query, classification structure, and a time required for the classification is stored; the time for which the document or folder has been altered is compared with the time required for the classification; and if the documents have not been altered, the stored classification structure is displayed. If the document has been altered, they are retrieved and reclassified.

This embodiment, as just describe above, has the following advantages:

(1) Documents can be classified unless attributes and keywords are added thereto. The documents can be retrieved/classified by handling the components constituting the structured document as if they were the attributes of the document without adding a keyword to the document or inputting attributes as in the conventional manner.

(2) Compatibility between a document and attributes necessary for retrieval is maintained. When the contents of a structured document are updated, compatibility of retrieval/classification is maintained by handling the components of the structured document as if they were the attributes of the document.

(3) The degree of update of a retrieval query is minimized. The present invention not only selects a target document set by simple retrieval, but also fine classifies the selected document set. A rough document set is selected in conformity with retrieval condition and a retrieval query is set which classifies the selected documents according to classification item. This enables the retrieval query to be used for multi-purposes without writing or rewriting the retrieval queries one by one.

(4) A document set can be fine classified according to classification item. By designating many classification items, the documents can be fine classified in various manner and not in a simple manner. This causes the user to have his own classification structure. Especially, when a document which a plurality of users share is searched, the same document set can be classified according to the user's classification structure and viewed irrespective of the classification structures/classification criteria which others use.

(5) Classification of documents is performed automatically on a real time basis. Documents are not required to be beforehand classified as is the above-mentioned Applications '229 and '721. The user is only required to designate a "classification attribute" to cause the device of this embodiment to classify all the documents automatically.

Finally, the features of the present invention will be described as follows:

(1) A plurality of classification structures is generated on a real time basis.

(2) A plurality of classifications is superimposed and exhibited as a hierarchical structure on a real time basis.

(3) The components of a document themselves are attributes.

(4) A value document set is picked up and classified, using retrieval query.

As described above, according to the present invention, a component of a structured document is designated as data necessary for the retrieval and classification of the structured document to retrieve structured documents having the designated component. The retrieved structured documents are classified for the structured documents having the component designated as the classification attribute. Thus a plurality of classification structures is generated and displayed on a real time basis by a command to retrieval/classification without classifying documents beforehand in a plurality of structures as is the conventional case.

This invention can be carried out in other various manners without departing from its spirit and main features. Therefore, the above-mentioned embodiments are only illustrative in every respect and should not be construed in a restrictive sense. The scope of the present invention is shown by the attached claims and not constrained by the text of the specification. All changes and modifications belonging to equivalents of the claims fall within the scope of the present invention.

What is claimed is:

1. A data classification device comprising:
    first designating means for designating a data group to be classified among a plurality of data groups, each of the data groups including one or more data units., each of the data units including a plurality of components;
    second designating means for designating one or more types of components as classification data; and
    classifying means for classifying data units within the data group designated by the first designating means into one or more classes based on the classification data designated by the second designating means.

2. A data classification device according to claim 1, wherein the data units are structured documents.

3. A data classification device according to claim 1, wherein the classification data further includes, in case of a plurality of..types of components designated as the classification data, hierarchical relationship among the types for hierarchical classification in which data units are classified into one or more upper level classes based on an upper level type of components and in which data units within each of the upper level classes are classified into one or more lower level classes based on a lower level type of components.

4. A data classification device according to claim 1, further comprising a display unit for displaying the data units classified into the one or more classes.

5. A data classification device according to claim 1, wherein the classifying means creates classification structure data on the basis of the data group thus classified.

6. A data classification device according to claim 5, further comprising a display units for displaying a classification structure based on the classification structure data.

7. A data classification device according to claim 1, wherein, when a plurality of types of components are designated as the classification data, the classifying means generates hierarchical classification structure data indicative of a hierarchical classification structure in which data units are classified into one or more upper level classes based on an upper level type of components and in which data units within each of the upper level classes are classified into one or more lower level classes based on a lower level type of components.

8. A data classification device according to claim 7, further comprising display unit for displaying the hierarchical classification structure based on the hierarchical classification data generated by the classifying means.

9. A data classification device according to claim 8, wherein the display unit displays elements of the classification structure hierarchically in corresponding icons on the basis of the hierarchical classification structure.

10. A data classification device according to claim 9, wherein the display unit displays actual contents of data units within a class corresponding to an element on the lowest level of the classification structure when an icon corresponding to the element is selected.

11. A data classification device comprising:
third designating means for designating a data group to be retrieved among a plurality of structured data groups, each of the data groups including one or more data units, each of the data units including a plurality of components;
fourth designating means for designating retrieval data;
retrieving means for retrieving the data group designated by the third designating means on the basis of the retrieval data designated by the fourth designating means;
fifth designating means for designating one or more types of components as classification data; and
classifying means for classifying data units retrieved by the retrieving means based on the classification data designated by the fifth designating means.

12. A structured data classification device according to claim 11, wherein the data units are structured documents.

13. A structured data classification device according to claim 11, wherein the retrieval data is one or more retrieval query expressions.

14. A structured data classification device according to claim 11, wherein the classification data further includes, in case of a plurality of types of components designated as the classification data, hierarchical relationship among the types for hierarchical classification in which data units are classified into one or more upper level classes based on an upper level type and in which data units within each of the upper level classes are classified into one or more lower level classes based on a lower level type.

15. A structured data classification device according to claim 11, wherein the classifying means creates classification structure data on the basis of the data group thus classified.

16. A structured data classification device according to claim 11, wherein when a plurality of the classification data are designated by the classification data designating means, the classifying means generates a hierarchical classification structure data by evaluating the classification data sequentially one item after another to perform a recursive classifying process wherein, when a plurality of types of components are designated as the classification data, the classifying means generates hierarchical classification structure data indicative of a hierarchical classification structure in which data units are classified into one or more upper level classes based on an upper level type of components and in which data units within each of the upper level classes are classified into one or more lower level classes based on a lower level type of components.

* * * * *